United States Patent [19]

Elias et al.

[11] 4,427,811

[45] Jan. 24, 1984

[54] SILICONE ELASTOMERIC EMULSION HAVING IMPROVED SHELF LIFE

[75] Inventors: Michael G. Elias; Alan L. Freiberg, both of Midland, Mich.

[73] Assignee: Dow Corning Corporation, Midland, Mich.

[21] Appl. No.: 422,805

[22] Filed: Sep. 24, 1982

Related U.S. Application Data

[63] Continuation-in-part of Ser. No. 335,952, Dec. 30, 1981, abandoned.

[51] Int. Cl.$^3$ .................. C08L 83/04; C08K 5/57; C08K 5/17
[52] U.S. Cl. ............................ 524/96; 524/178; 524/247; 524/251; 524/437; 524/445; 524/446; 524/447; 524/492; 524/493; 524/588; 528/18
[58] Field of Search ............... 524/588, 178, 96, 247, 524/437, 445, 446, 447, 492, 493; 528/18

[56] References Cited

U.S. PATENT DOCUMENTS 4,221,688 9/1980 Johnson et al. ............... 260/29.2 M Primary Examiner—Theodore E. Pertilla
Attorney, Agent, or Firm—Edward C. Elliott

[57] ABSTRACT

A silicone elastomeric emulsion having improved shelf life is produced by a method which mixes the ingredients of the emulsion with the exception of a filler other than colloidal silica, then ages the mixture for at least two weeks at room temperature then adds the filler other than colloidal silica. The improved emulsion yields a film upon drying that has better physical properties. The emulsion contains an anionically stabilized, hydroxyl endblocked polydiorganosiloxane, colloidal silica, and an alkyl tin salt, as well as the filler other than colloidal silica. The emulsion has a pH of greater than 9 and a solids content of greater than 40 percent by weight. The emulsion is useful in forming a protective elastomeric coating over a substrate and as a caulking material.

24 Claims, No Drawings

SILICONE ELASTOMERIC EMULSION HAVING IMPROVED SHELF LIFE

This application is a continuation-in-part of Application Ser. No. 335,952, filed Dec. 30, 1981, abandoned.

BACKGROUND OF THE INVENTION

1. Field of the Invention

This invention relates to an improved method of manufacturing a silicone elastomeric emulsion of high solids content.

2. Description of the Prior Art

Silicone elastomeric emulsions are described in U.S. Pat. No. 4,221,688, issued Sept. 9, 1980, to Johnson et al. This patent teaches a silicone emulsion which provides an elastomeric product upon removal of the water. The dispersed phase consists essentially of an anionically stabilized hydroxylated polydiorganosiloxane which contains about 2 silicon-bonded hydroxyl groups per molecule, an organic tin compound, and a colloidal silica. The emulsion can also contain other fillers including clays, aluminum oxide, quartz, calcium carbonate, zinc oxide, and mica. The method of manufacture prepares an emulsion of a hydroxylated polydiorganosiloxane, adds colloidal silica and organic tin compound, and adjusts the pH of the resulting emulsion to a range of 9 to 11.5 inclusive. This patent teaches that if the emulsion without the organic tin compound is stored, such as for five months, a useful film is formed upon drying. By adding the organic tin compound, the emulsion need only be stored for one to three days before a useful elastomeric product is formed upon drying.

SUMMARY OF THE INVENTION

An improved silicone elastomeric emulsion is produced by mixing the ingredients of the emulsion, with the exception of filler other than colloidal silica, to form a base emulsion; then aging this base emulsion for at least two weeks at room temperature; then adding the filler. This method produces a silicone elastomeric emulsion which forms a silicone elastomer upon drying. This silicone elastomer has improved physical properties when compared to a similar formulation prepared without aging.

It is an object of this invention to produce a silicone elastomeric emulsion having an improved shelf life.

It is an object of this invention to produce a silicone elastomeric emulsion which yields an elastomer upon drying which has improved resistance to heat and weathering.

DESCRIPTION OF THE INVENTION

This invention relates to a method of improving the shelf life of a silicone elastomeric emulsion which comprises an anionically stabilized, hydroxyl endblocked polydiorganosiloxane, colloidal silica, an alkyl tin salt, and filler other than colloidal silica comprising preparing the silicone elastomeric emulsion by (I) mixing (A) 100 parts by weight of an anionically stabilized, hydroxyl endblocked polydiorganosiloxane having a weight average molecular weight of greater than 50,000, present as an oil-in-water emulsion, (B) from 1 to 100 parts by weight of colloidal silica, and (C) from 0.1 to 1.5 parts by weight of alkyl tin salt, adjusting to a pH of greater than 9, withholding the filler other than colloidal silica to give a base emulsion; (II) aging the base emulsion for at least 2 weeks at room temperature, then; (III) mixing the aged base emulsion with from 10 to 200 parts by weight of filler other than colloidal silica based upon 100 parts by weight of (A) in the aged base emulsion, to produce a silicone elastomeric emulsion having a pH of greater than 9 and a solids content of greater than 40 percent by weight.

The method of this invention includes aging the base emulsion, step (II), at least two weeks at room temperature. This aging period is a novel step in the process of producing silicone elastomeric emulsions.

It had been discovered that silicone elastomeric emulsions, for example those of Johnson et al., containing a filler other than colloidal silica, such as kaolin clay or calcium carbonate, could be dried to yield a silicone elastomer having useful physical properties. Experience with such emulsions has shown that the physical properties of the silicone elastomer formed depended upon the age of these silicone elastomeric emulsions when dried. The longer the period of time between the manufacture of these silicone elastomeric emulsions and the drying of the emulsion to a silicone elastomer, the poorer the physical properties became, particularly the elongation. The cause of this loss of properties on aging of the silicone elastomeric emulsion is not known, but a method of preventing or minimizing the amount of loss has been discovered.

If the filler other than colloidal silica is added to the base emulsion after an aging or storage period, the physical properties of the resulting silicone elastomer are improved. Tests have shown that the aging period needs to be at least two weeks at room temperature in order to obtain the best results. If the period is less than two weeks, the improvement in physical properties is not as great. A period of longer than two weeks is satisfactory, but no further significant improvement in physical properties results.

The method of this invention also requires a solids content by weight of greater than 40 percent. For purposes of this invention, the solids content is defined as the non-volatile content of an emulsion. The non-volatile content is determined by placing 2 g of emulsion in an aluminum weighing dish of 50 mm diameter and heating in an air circulating oven for 1 hour at 150° C. After cooling, the dish is reweighed and the percent of the original 2 g remaining is determined. This percentage is the percent solids in the emulsion.

Compositions prepared by the method of this invention are useful as coatings on substrates and as caulking material. In these types of applications, it is necessary that the silicone elastomer formed on drying is a continuous coating, without cracks or voids. In order to form such a continuous coating on drying, the emulsion must not shrink excessively. The higher the solids content of the silicone elastomeric emulsion, the less the shrinkage upon drying and the less likely that the dried coating will contain cracks or voids. The silicone elastomeric emulsions can have different utilities, thus the solids content can vary from utility to utility, and each utility may have its own solids content range. A paint-type product used in a thin film, for instance about 0.25 mm, may dry properly with a solids content of 40 percent by weight. A caulking material, used in wet thicknesses of 5 to 20 mm for instance, may require a solids content of 70 percent by weight or greater in order to dry to a solid elastomer without cracks or voids. A method of characterizing caulking material is a slump test which measures the tendency of a material to flow when placed upon a vertical surface. A test method is described in ASTM D-2202. The distance that the caulking material flows in three hours is the flow of the caulking material. Useful caulking materials vary in flow when tested in this manner. A caulking material having a flow in the range of 0 to 10 mm is useful on vertical surfaces. Caulking materials with higher amounts of flow may be useful in other locations, for instance in horizontal joints. For purposes of this invention a non-slump material is that which flows less than 5 mm when tested in this manner.

The base emulsion, used in the method of this invention, contains an anionically stabilized, hydroxyl endblocked polydiorganosiloxane, colloidal silica, and alkyl tin salt as described in U.S. Pat. No. 4,221,688, issued Sept. 9, 1980, to Johnson et al., hereby incorporated by reference to describe the ingredients and method of manufacture of the base emulsion.

The hydroxyl endblocked polydiorganosiloxanes, (A), are those which can be emulsified, which impart elastomeric properties to the product obtained after the removal of the water from the emulsion, and which are anionically stabilized. The weight average molecular weight ($\overline{M}w$) of the hydroxyl endblocked polydiorganosiloxanes used in this invention are above 50,000 $\overline{M}w$. Tensile strengths and elongations at break improve with increasing molecular weight, with suitable tensile strengths and elongations obtained above 50,000 $\overline{M}w$. The maximum weight average molecular weight is one which can be emulsified and which will give elastomeric properties to the product obtained after the water is removed from the emulsion. Weight average molecular weights up to about 1,000,000 for the hydroxyl endblocked polydiorganosiloxane are expected to be practical for this invention. The preferred $\overline{M}w$ for the hydroxyl endblocked polydiorganosiloxanes are in the range of 200,000 to 700,000.

The organic radicals of the hydroxyl endblocked polydiorganosiloxane can be monovalent hydrocarbon radicals containing less than seven carbon atoms per radical and 2-(perfluoroalkyl)ethyl radicals containing less than seven carbon atoms per radical. Examples of monovalent hydrocarbon radicals include methyl, ethyl, propyl, butyl, isopropyl, pentyl, hexyl, vinyl, cyclohexyl, and phenyl. Examples of 2-(perfluoroalkyl)ethyl radicals include 3,3,3-trifluoropropyl and 2-(perfluorobutyl)ethyl. The hydroxyl endblocked polydiorganosiloxanes preferably contain organic radicals in which at least 50 percent are methyl. The hydroxyl endblocked polydiorganosiloxanes are essentially linear polymers containing two organic groups per silicon atom but may include trace amounts of monoorganosiloxane or triorganosiloxy units present as impurities of the manufacturing process. The preferred hydroxyl endblocked polydiorganosiloxanes are the hydroxyl endblocked polydimethylsiloxanes.

The preferred anionically stabilized, hydroxyl endblocked polydiorganosiloxanes are those prepared by the method of anionic emulsion polymerization described by Findlay et al. in U.S. Pat. No. 3,294,725, issued Dec. 27, 1966, which is hereby incorporated by reference to show the methods of polymerization, the ingredients used, and the hydroxyl endblocked polydiorganosiloxane obtained in an emulsion. Another method of preparing the anionically stabilized, hydroxyl endblocked polydiorganosiloxane is described by Hyde et al. in U.S. Pat. No. 2,891,920, issued June 23, 1959, which is hereby incorporated by reference to show the hydroxyl endblocked polydiorganosiloxanes, the ingredients used, and their method of preparation. These methods and others are known in the art. The hydroxyl endblocked polydiorganosiloxanes used in this invention are those which are anionically stabilized. For the purpose of this invention "anionically stabilized" means the hydroxyl endblocked polydiorganosiloxane is stabilized in emulsion with an anionic surfactant. This silicone emulsion is in the form of an oil-in-water emulsion. Silicone elastomeric emulsions useful as coatings are preferably prepared from silicone emulsion (A) having a solids content of from 40 to 65 percent by weight. When the silicone elastomeric emulsion is to be used as a caulking material, it is preferred that the solids content of the silicone emulsion (A) be greater than 55 percent by weight because a minimum amount of water is preferred in the caulking materials.

Ingredient (B) is colloidal silica. The emulsion of the anionically stabilized, hydroxyl endblocked polydiorganosiloxane does not yield a cured film upon drying if colloidal silica is absent. Finely divided colloidal silicas are those capable of being dispersed in the polydiorganosiloxane emulsion. The common forms of colloidal silica are available as colloidal silica dispersions in water, as dry powders of fumed silica or precipitated silica, and the mined amorphous silicas that are known as diatomaceous earth. The preferred colloidal silica is a sodium ion stabilized aqueous dispersion which is readily mixed with silicone emulsion (A). Such dispersions are commercially available. Commercial colloidal silica dispersions are available with solids contents from 15 percent by weight to 50 percent by weight. The particles of the dispersed colloidal silica in the sodium ion stabilized aqueous dispersions can have surface areas ranging from 125 $m^2/g$ to 800 $m^2/g$. The finer the average size of the particles, the higher the tensile strength and the lower the elongation of the cured silicone elastomeric emulsion. The shelf life of the silicone elastomeric emulsion is shortened as the average size of the colloidal silica particles is reduced. The shelf life of the silicone elastomeric emulsion is also reduced as the amount of colloidal silica is increased. The preferred amount of colloidal silica is from 1 to 20 parts by weight based upon 100 parts by weight of polydiorganosiloxane. When the silicone elastomeric emulsion has a solids content of greater than 65 percent by weight, it is preferred that the amount of colloidal silica is from 2 to 5 parts by weight.

An alkyl tin salt, preferably a dialkyltindicarboxylate, is a required ingredient of the base emulsion. Dialkyl tin salts can be used in amounts of from 0.1 to 1.5 parts by weight for each 100 parts by weight of (A). The preferred amounts are from 0.1 to 0.75 part. When the silicone elastomeric emulsion has a solids content of greater than 65 percent by weight, the preferred amount of dialkyltin dicarboxylate is from 0.1 to 0.3 parts by weight with from 0.2 to 0.3 parts most preferred. Preferred dialkyltindicarboxylates include dibutyltindiacetate, dibutyltindilaurate, and dioctyltindilaurate with dioctyltindilaurate most preferred.

The pH of the silicone elastomeric emulsion must be above 9. The hydroxyl endblocked polydiorganosiloxane in the base emulsion may not contain exclusively silicon-bonded hydroxyl radicals. Some of the hydrogen atoms of the silicone-bonded hydroxyl radicals may be replaced with an alkali metal ion, such as sodium ion; may be complexed with an amine; or may be associated with an emulsifying agent. Thus, the term "hydroxyl endblocked polydiorganosiloxane" as used herein covers all the species of terminating groups which may be formed by emulsifying a hydroxyl endblocked polydiorganosiloxane at a pH of greater than 9.

The silicone base emulsions which contain hydroxyl endblocked polydiorganosiloxane, colloidal silica and alkyl tin salt, and have a pH of greater than 9 do not require additional ingredients to obtain an elastomeric product after the water is removed at ambient conditions. However, certain additional ingredients have been found useful in providing certain advantageous characteristics to the base emulsion and to the silicone elastomeric emulsion and the elastomeric products obtained therefrom. For example, a thickener can be added to improve the handling characteristics of the silicone elastomeric emulsion such as thixotrophy and structural viscosity. The thickener is useful for increasing the working viscosity of the silicone elastomeric emulsion to provide a material which can be used to coat a substrate with a film of elastomeric product. Such silicone elastomeric emulsions with thickener permit the application of thicker coats which form thicker elastomeric films. The use of a thickener also permits a broader versatility of the silicone elastomeric emulsion by allowing one to select the proper and most convenient emulsion consistency for a specific application. Suitable thickeners are available commercially and are selected for their stability and usability, at pH of 9 and greater. Some of the useful thickeners include the classes of cellulose derivatives, alkali salts of polyacrylates and polymethylacrylates, and sodium and ammonium salts of carboxylate copolymers. These and other thickeners can be used, but it is advised that a particular thickener be tried on a small scale to determine that it does not adversely effect the storage stability of the emulsion, the formation of the elastomeric product, or the resulting properties of the elastomeric product. The thickener is preferably added during step (I). For the silicone elastomeric emulsions of this invention, the best thickeners are the sodium salts of polyacrylates.

The pH of the base emulsion can be adjusted by any number of methods such as those described in U.S. Pat. No. 4,221,688, incorporated above. The preferred method in this invention is by use of an organic amine. Suitable organic amines include diethylamine, monoethanolamine, morpholine, and 2-amino-2-methyl-1-propanol. The preferred amines are diethylamine and 2-amino-2-methyl-1-propanol. The preferred amine for caulking materials is the 2-amino-2-methyl-1-propanol.

Frothing can be encountered during the mixing steps of this invention. It is advantageous to add an antifoam agent to control such frothing. A preferred class of antifoam agents is that based upon silicones, such being commercially available.

Another ingredient commonly used in emulsions is a freeze-thaw stabilizer such as ethylene glycol or propylene glycol.

A filler other than colloidal silica is used in the method of this invention in Step (III). Examples of fillers other than colloidal silica (hereinafter referred to as "filler") include carbon black, titanium dioxide, clays, aluminum oxide, quartz, calcium carbonate, zinc oxide, mica, and various colorant pigments. Fillers can be used as extending fillers to reduce the cost per unit volume of the elastomeric product or to make the silicone elastomeric emulsion useful as a caulking material. These fillers should be finely divided and it may be advantageous to use aqueous dispersions of such fillers if they are commercially available, such as aqueous dispersions of carbon black. The silicone base emulsions used in the present invention do not require that the filler be added in the form of aqueous emulsions, as the silicone base emulsion readily accepts the finely divided fillers in dry form.

The filler can be selected to provide certain properties for the elastomer. For instance, kaolin clay produces silicone elastomeric emulsions which are useful as paints for concrete to provide a waterproof coating. A large amount of the clay can be added in the manufacture of the silicone elastomeric emulsion to provide a high solids content, such as 80 percent by weight. Such silicone elastomeric emulsions with a viscosity of 60 Pa·s to 150 Pa·s at 25° C. can be used to paint or spray a surface and obtain a relatively thick, wet film which dries without cracking.

An elastomeric product resistant to heat or weathering can be made by using calcium carbonate rather than clay. The elastomeric product obtained from drying silicone elastomeric emulsion containing calcium carbonate exhibits better retention of physical properties on exposure to heat and weathering than does the product containing clay.

Titanium dioxide is a useful filler in silicone elastomeric emulsions used as a protective coating, because this filler gives opaque films which protect a substrate from the effects of ultraviolet light.

The filler preferably has an average particle diameter of less than 10 micrometers. Useful fillers have had average particle diameters ranging down to as low as 0.05 micrometers.

The method of this invention comprises (I) mixing an anionically stabilized, hydroxyl endblocked polydiorganosiloxane with colloidal silica and alkyl tin salt. The preferred colloidal silica is a colloidal silica in the form of a sodium ion stabilized aqueous dispersion. There are many such dispersions commercially available having from 15 to 50 weight percent colloidal silica and having a pH in the range of 8.5 to 10.5. The ingredients, (A), (B), (C), can be mixed in any order, but preferably the silica (B) and amine, if necessary, are mixed together, then the emulsion of hydroxyl endblocked polydiorganosiloxane (A) is mixed in. Antifoam agent and freeze-thaw stabilizer are added if desired.

The required alkyl tin salt (C) is then mixed into the emulsion. The emulsion at this point must have a pH of greater than 9. With the proper selection of ingredients, the emulsion should be at the proper pH at this point. The useful upper pH level is determined by practical considerations. The higher the pH, the more corrosive the silicone emulsion becomes so there should not be an excess of basic compound added. When the pH is above 12, amorphous silica present tends to be dissolved. The system tends to change in pH with time, adjusting to a range of from 10.5 to 11.5.

At this point in the method of this invention, the base emulsion is stored for a period of at least two weeks at room temperature before the next step in the method. The base emulsion is stable and only needs to be placed in a suitable container during this storage period, i.e., a container that is compatible with the basic emulsion; high density polyethylene has been found most suitable. It is not known what takes place during this storage period, but the effect of the storage period upon the properties of the finished silicone elastomeric emulsion are easily shown, as in the examples below.

It is believed that useful base emulsions can be made by varying the gestation temperature above or below room temperature. Lower temperatures are believed to require longer storage times before the filler other than silica can be added and higher temperatures are believed to require shortened time before the filler other than silica can be added. Useful products would be expected from such silicone elastomeric emulsions, but room temperature gestation is preferred.

After the storage period, the base emulsion is mixed with the desired filler or fillers. The filler used depends, to some extent at least, upon the end use of the silicone elastomeric emulsion as discussed above. The mixing equipment used depends upon the type of finished product being made. Silicone elastomeric emulsions for use as paints, for instance, can be mixed in suitable mixers for such flowable or thixotropic mixtures intended to be brushed or sprayed onto a substrate. Silicone elastomeric emulsions for use as caulking material, for instance, would be mixed in much heavier duty mixers suitable for mixing such materials which must be extruded under pressure when being used. After mixing in the filler, the product is a silicone elastomeric emulsion.

A silicone elastomeric emulsion is produced when the colloidal silica is present in an amount of from 1 to 20 parts by weight based upon 100 parts by weight of the polydiorganosiloxane and the filler is kaolin clay. Silicone elastomeric emulsions containing clay can have viscosities varying from flowable, paint-type materials to non-flowable, paste-type caulking materials.

Another silicone elastomeric emulsion is produced when the colloidal silica is present in an amount of from 2 to 20 parts by weight and the filler is calcium carbonate having an average particle size of less than 5 micrometers. Even finer particles given more uniform mixtures with improved physical properties.

A silicone elastomeric emulsion for use as a caulking material is produced by proper selection of the ingredients. The polydiorganosiloxane of (A) that is preferred is a polydimethylsiloxane having a weight average molecular weight in the range of from 200,000 to 700,000. Because the caulking material should have a high solids content, emulsion (A) has a solids content of greater than 55 percent by weight. The colloidal silica (B) is a sodium stabilized dispersion with a solids content of from 40 to 60 percent by weight for the same reason. The preferred amount of colloidal silica is from 2 to 5 parts by weight. This amount and type of colloidal silica is believed to give the best balance of physical properties and shelf life for this application. The dialkyltindicarboxylate (C) is preferably dioctyltindilaurate with the preferred amount from 0.2 to 0.3 part by weight. The base emulsion is adjusted to a pH of from 9 to 12 with an amine selected from the group consisting of diethylamine, monoethanol amine, morpholine, and 2-amino-2-methyl-1-propanol with 2-amino-2-methyl-1-propanol preferred.

Silicone elastomers obtained from stored caulking materials have shown a decrease in elongation as the storage period increased. Making the silicone elastomeric emulsions useful as caulking materials with 2-amino-2-methyl-1-propanol give silicone elastomers with high elongation and increased storability. A high elongation is desirable in caulking material such as this because such a material also has a low modulus of elasticity. When a joint containing such a caulking material moves, the stresses on the caulking material tending to rupture the caulking material or break the bond to the substrate are lower for materials having a low modulus. Because the emulsion produced using the 2-amino-2-methyl-1-propanol has a high initial elongation, the useful life of the silicone elastomeric emulsion is effectively extended. The preferred filler for this application is a water ground calcium carbonate having a maximum particle size of 5 micrometers and an average particle size of between 0.5 and 1.0 micrometer. This filler is used in an amount of from 110 to 180 parts by weight. The higher amount of filler produces a caulking material with a minimum amount of shrinkage upon drying. Low shrinkage is necessary when the caulking material is applied in thick sections, as in sealing a deep crack in a building. The silicone elastomeric emulsion has a viscosity high enough to prevent an excessive amount of flow upon application of the caulking material to a vertical surface.

The silicone elastomeric emulsion of this invention is useful for forming coatings on substrates and as caulking material. Walls to be buried underground can be coated to render them waterproof. If the substrate cracks in use, the coating from the emulsion is elastic so that the coating will bridge the crack and protect the substrate. The silicone elastomeric emulsion can be used to coat surfaces exposed to the weather to protect them from the effects of sunlight, moisture, and air. The cured emulsion has the excellent weatherability common to silicone elastomers. The silicone elastomeric emulsion can be in the form of caulking material, where it is useful in sealing cracks, as in buildings.

The following examples are included for illustrative purposes only and should not be construed as limiting the invention which is properly set forth in the appended claims. All parts are parts by weight.

EXAMPLE 1

A comparison of manufacturing methods for producing silicone elastomeric emulsions was prepared.

An aqueous silicone emulsion (Emulsion A) was prepared from 100 parts of linear hydroxyl endblocked polydimethylsiloxane, 62.5 parts water, 3.8 parts of sodium lauryl sulphate surfactant, and 0.8 part of dodecylbenzenesulphonic acid. This emulsion had a pH of about 3 and contained about 60 percent by weight of emulsion polymerized hydroxyl endblocked polydimethylsiloxane having a weight average molecular weight of about 325,000.

A silicone base emulsion was prepared by mixing 30 parts of an aqueous sodium stabilized colloidal silica, having a solids content of 50 percent, with 2 parts of diethylamine as a stabilizer. Then 172 parts of Emulsion A was stirred in, followed by 0.5 part of an antifoam of 35 percent solids polydimethylsiloxane/silica mixture, 0.5 part of ethylene glycol as a freeze-thaw stabilizer, and 0.5 part of a tin containing emulsion containing 50 weight percent dioctyltindilaurate, 9 weight percent of a sodium alkylarylpolyether sulphonate and 41 percent water to give a silicone base emulsion. Then 80 parts of kaolin having a median particle size of 0.77 micrometer and a surface area of 10 m$^2$/g were added to the silicone base emulsion without any aging period. This silicone elastomeric emulsion had a solids content of about 69 percent by weight.

This silicone elastomeric emulsion was then aged for a period of greater than 2 weeks, then a film of the silicone elastomeric emulsion was prepared by spreading a layer of the emulsion about 1.5 mm thick over a flat surface and allowing the emulsion to dry for 7 days. A portion of the film was tested for ultimate elongation in accordance with ASTM D-412. The result is shown in Table I.

The silicone elastomeric emulsion was aged at 50° C. for periods of 2 weeks and 4 weeks. Previous work has indicated that 4 weeks at 50° C. is equivalent to 9 months at room temperature. After each aging period, a film was prepared and tested as was done initially. The results in Table I show that the ultimate elongation of the cured film drops as the uncured emulsion shelf ages. After the 4 week aging period, the film only had 52 percent of its original elongation.

A second silicone elastomeric emulsion was prepared following the method of this invention.

An emulsion mixture was prepared using the identical materials, amounts, and procedure as shown above for the base emulsion, but the base emulsion was aged for 8 weeks at room temperature before the addition of the clay filler. After the addition of the clay filler, a film of this silicone elastomeric emulsion was prepared and tested as described above. The emulsion was aged at 50° C., then films were prepared and tested in a manner identical to that for the first emulsion. The results are shown in Table I.

The ultimate elongation of a film formed from emulsion produced following the method of this invention was much higher than that produced from a film formed from an emulsion not produced in the manner of this invention. The superior result remained throughout the life of the emulsion, with films produced from aged emulsion produced following the method of this invention retaining 73 percent of their original superior value after a 4 week aging period at 50° C.

TABLE I

| Process | Initial | Ultimate Elongation, Percent | |
|---|---|---|---|
| | | Aged 2 Weeks at 50° C. | Aged 4 Weeks at 50° C. |
| Control | 705 | 485 | 370 |
| This Invention | 1115 | 1170 | 810 |

EXAMPLE 2

Silicone elastomeric emulsions were prepared following both a control method of manufacture and the method of this invention with a variety of filler types.

A silicone elastomeric emulsion was prepared by mixing 30 parts of the colloidal silica of Example 1 with 2.75 parts of diethylamine. Then 167 parts Emulsion A was stirred in, followed by 0.25 part of the antifoam of Example 1 and 0.5 part of the dioctyltindilaurate emulsion of Example 1. Then 77 parts of ground quartz filler having an average particle size of 10 micrometers was stirred in without an aging period. The finished emulsion had a solids content of about 70 percent by weight and a pH of greater than 9.

The emulsion was aged for 4 weeks at room temperature, then a film was formed, cured and tested as in Example 1. Tear strength was determined in accordance with ASTM D-624. The results are shown in Table II.

A second and third emulsion was prepared following the above method with the substitution of calcium carbonate and aluminum oxide for the ground quartz. These emulsions were aged and tested in the same manner as the first emulsion with the results shown in Table II.

The method of this invention was followed in preparing three more silicone elastomeric emulsions having identical formulations to the three described above. Each emulsion mixture was prepared as described above, but the mixture was aged for 4 weeks at room temperature before the addition of the appropriate filler, either ground quartz, calcium carbonate, or aluminum oxide. Three days after the filler addition, a film was formed, cured, and tested as above described. The results are shown in Table II.

A comparison of the results in Table II shows that the method of this invention yields a silicone elastomeric emulsion which cures to a more elastic film than that obtained from an emulsion having the same formulation, but manufactured in the control method.

TABLE II

| Method | Filler | Tensile Strength MPa (megaPascal) | Elongation percent | Tear Strength kN/m (kiloNewton/meter) |
|---|---|---|---|---|
| Control | Ground Quartz | 1.08 | 348 | 5.25 |
| Control | Calcium Carbonate | 0.98 | 797 | 4.02 |
| Control | Aluminum Oxide | 0.70 | 288 | 1.58 |
| This Invention | Ground Quartz | 1.03 | 647 | 7.35 |
| This Invention | Calcium Carbonate | 1.04 | 1100 | 6.30 |
| This Invention | Aluminum Oxide | 0.71 | 960 | 4.38 |

EXAMPLE 3

An elastomer was prepared using the method of this invention. An aqueous sodium stabilized colloidal silica having about 50 weight percent colloidal silica in an amount of 30 parts was mixed with 2 parts of diethylamine. Then Emulsion A, in an amount of 167 parts was mixed in. Then 0.5 part of the antifoam of Example 1 and 0.5 part of the tin emulsion of Example 1 were added. The mixture was then aged for 2 weeks at room temperature.

After the aging period, the mixture was combined with 75 parts of the kaolin clay of Example 1 (Clay A) and 0.5 part ethylene glycol as a freeze-thaw stability additive.

A sample of the silicone elastomeric emulsion was dried to yield an elastomer and the elastomer was heat aged at 150° C. The weight loss results are shown in Table III.

EXAMPLE 4

A series of silicone elastomeric emulsions was prepared following the method of this invention using calcium carbonate filler.

The colloidal silica of Example 3 in an amount of 30 parts was mixed with 2 parts of diethylamine. Then 167 parts of Emulsion A was added. Then 0.5 part of the antifoam of Example 1 and 0.5 part of the tin emulsion of Example 1, and 0.5 part of ethylene glycol were added. The base emulsion was then aged for 4 weeks at room temperature.

After the aging period, 100 parts of a calcium carbonate filler "E" was added. The filler was a precipitated calcium carbonate having a median particle size of 0.05 micrometer.

A second mixture was prepared, similar to above, but beginning with 30 parts of a colloidal silica having about 30 percent solids. After the aging period, this mixture was mixed with 100 parts of a precipitated calcium carbonate filler "F" having an unknown particle size.

A third mixture was prepared in the same manner, using the same ingredients as the second mixture above, but using a ground calcium carbonate filler "G" having a median particle size of 2.5 micrometers.

A portion of the above mixture was mixed after a period of 4 weeks with 26.3 parts of titanium dioxide slurry having a solids content of 76 percent by weight.

Another portion of the above mixture was mixed with 39.5 parts of the titanium dioxide slurry.

Each of the three silicone elastomeric emulsions were cast into films, dried, and tested as in Example 5. The results are shown in Table IV.

The samples produced using calcium carbonate filler have a much better retention of physical properties on aging exposed in the weatherometer than do the samples produced using kaolin clay filler.

TABLE IV

| Example | TiO₂ Parts | Tensile Strength, MPa | | | | Elongation, percent | | | |
|---|---|---|---|---|---|---|---|---|---|
| | | Initial | 1000 hours | 2000 hours | 3000 hours | Initial | 1000 hours | 2000 hours | 3000 hours |
| 5 | | 1.27 | 0.96 | 0.88 | — | 1150 | 310 | 45 | — |
| 5 | | 1.34 | 1.01 | 0.76 | — | 1083 | 215 | 65 | — |
| 6 | — | 1.10 | 1.35 | — | 1.02 | 789 | 654 | — | 665 |
| 6 | 20 | 1.06 | 1.21 | — | 1.03 | 816 | 737 | — | 687 |
| 6 | 30 | 1.07 | 1.29 | — | 1.12 | 968 | 835 | — | 825 |

A sample of each silicone elastomeric emulsion was dried and heat aged as in Example 3. The weight loss results are shown in Table III.

The samples produced following the method of this invention using calcium carbonate filler have a much lower weight loss when heat aged at 150° C. than do the samples using clay filler.

TABLE III

| | | | Percent Weight Loss | | | |
|---|---|---|---|---|---|---|
| Example | Clay | Calcium Carbonate | 1 Week | 2 Weeks | 4 Weeks | 16 Weeks |
| 3 | A | — | 17.4 | 41.9 | 51.7* | — |
| 4 | — | E | 2.4 | — | 3.7 | 3.8 |
| 4 | — | F | 2.0 | — | 3.0 | 3.3 |
| 4 | — | G | 2.7 | — | 3.7 | 4.1 |

*Sample brittle

EXAMPLE 5

A silicone elastomer emulsion was prepared as in Example 3 except the initial mixture was aged 8 weeks before adding the kaolin clay. A film of the emulsion was prepared 7 days after adding the kaolin clay by spreading a layer of the emulsion over a flat surface and allowing the film to cure. A portion of the film was tested for tensile strength and elongation in accordance with ASTM D-412. The results are shown in Table IV.

A second sample was prepared and tested as above to show the degree of reproducability. The results are shown in Table IV.

Additional samples of the elastomeric films were prepared in an ultraviolet light intensive weatherometer to simulate the effect of long-time exposure to the atmosphere. Samples were removed and tested after aging as shown in Table IV and tested with the results shown in Table IV.

EXAMPLE 6

A series of silicone elastomeric emulsions was prepared following the method of this invention.

The method of Example 3 was followed up to the aging period. The mixture was aged for 4 weeks, then an additional 0.5 part of antifoam, 80 parts of the calcium carbonate filler "G" of Example 4 and 2 parts of acrylic thickener were added.

EXAMPLE 7

Compositions were prepared following both methods of manufacture to show the differences in properties of the cured films produced from the two emulsions.

A silicone elastomeric emulsion was prepared following a control method of manufacture by mixing 30 parts of aqueous sodium stabilized colloidal silica, having a solids content of 50 percent, with 2.75 parts of diethylamine. Then 167 parts of Emulsion A was stirred in, followed by 0.25 part of the antifoam of Example 1, and 0.5 part of the tin emulsion of Example 1. Then 77 parts of calcium carbonate was mixed into the emulsion without any aging period.

The emulsion was aged for 4 weeks at room temperature, then a film was formed, cured, and tested as in Example 5. Tear strength was determined in accordance with ASTM D-624. The results are shown in Table V.

A second sample was prepared using the same ingredients and amounts but following the method of this invention in that the mixture was aged for 4 weeks at room temperature before the addition of the calcium carbonate filler. The silicone elastomeric emulsion was then stored 4 weeks as before, a film was formed and tested as before. The results are shown in Table V. It is apparent from the results that the method of this invention yields higher physical strengths.

TABLE V

| Method | Tensile Strength MPa (megaPascal) | Elongation percent | Tear Strength kN/m (kilo-Newton/meter) |
|---|---|---|---|
| Control | 0.98 | 797 | 4.02 |
| This Invention | 1.04 | 1100 | 6.30 |

EXAMPLE 8

An emulsion useful as a caulking material was produced following the method of this invention.

A blend tank containing a stirrer was charged with 4.4 parts of the aqueous colloidal silica of Example 1, then 1 part of diethylamine was added and thoroughly mixed in. Next, 94 parts of Emulsion A, 0.27 part of the tin containing emulsion of Example 1, and 0.27 part of ethylene glycol were mixed in. The resulting base emulsion, after sufficient stirring to ensure homogeneity, was placed in a polyethylene container with a closed lid and stored at room temperature for greater than two weeks. This base emulsion had a pH between 10.5 and 12, a solids content of about 60 percent by weight and a viscosity of about 0.7 Pa·s at 25° C.

After the storage period, 100 parts of this base emulsion was placed into a mixer having both a stirring paddle which was capable of stirring the contents of the mixer and a high speed mixing blade capable of imparting a high shear to the mixture in contact with this blade. Then 1.6 parts of titanium dioxide pigment and 65.6 parts of a calcium carbonate filler that had a sodium polyacrylate process aid present and had an average particle size of approximately 0.7 micrometer was added. The mixer was closed and a vacuum drawn on the container to remove the air in the container. The mixer was then operated to disperse the filler into the emulsion to obtain a homogeneous mixture without air being mixed into the emulsion.

This homogeneous mixture was a caulking material having a solids content of about 75 percent by weight and a consistency such that it did not flow when extruded onto a vertical surface. Upon drying, the material remaining was a silicone elastomer having a tensile strength of greater than 0.7 MPa and an ultimate elongation of greater than 800 percent.

EXAMPLE 9

A series of emulsions useful as a caulking material were prepared using different amounts and types of amines to adjust the pH of the base emulsion.

A blend tank containing a stirrer was charged with 172 parts of Emulsion A and 1 part of an acrylic thickener of 30 percent solids. Then 8 parts of the aqueous colloidal silica of Example 1, 0.5 part of ethylene glycol, and 0.5 part of the tin-containing emulsion of Example 1 were stirred in until a homogeneous mixture was formed. Then the amount and type of amine shown in Table VI was added and the mixture was stirred for 1 hour and then placed in polyethylene storage containers. Each emulsion had a pH of between 10.5 and 12.

After a storage period of 4 weeks, 100 parts of the emulsions were mixed, following the procedure of Example 8, with 95 parts the calcium carbonate filler of Example 8. The mixtures were caulking materials having a solids content of about 78 percent by weight and a consistency such that they did not flow over 8 mm when extruded onto a vertical surface.

Upon forming into a sheet 3 days after the addition of the calcium carbonate filler and drying, the cured material remaining was tested for physical properties as in Example 2. The results in Table VI show that the 2-amino-2-methyl-1-propanol gives a caulking material having a higher elongation than that prepared using diethylamine.

TABLE VI

| Amine | Amount | Tensile Strength MPa | Elongation Percent | Tear Strength kN/m |
|---|---|---|---|---|
| diethylamine | 2 parts | 0.94 | 479 | 7.9 |
| | 4 parts | 1.13 | 404 | 10.0 |
| 2-amino-2-methyl-1-propanol | 2 parts | 0.85 | 842 | 6.6 |
| | 4 parts | 0.92 | 901 | 6.8 |

EXAMPLE 10

Silicone elastomeric emulsions useful as a caulking material were prepared with different amines to evaluate their useful shelf life.

The first emulsion was prepared as in Example 9 using 2 parts of diethylamine in the base emulsion and using 87 parts of the calcium carbonate filler to produce the caulking material.

A second emulsion was prepared in an identical manner except 4 parts of 2-amino-2-methyl-1-propanol was used in place of the diethylamine, and the base emulsion was aged 2 weeks before adding the calcium carbonate filler.

A portion of each emulsion was formed into a sheet, dried, and then tested for physical properties as in Example 8.

The remainder of each emulsion was then aged in its storage container at 50° C. to simulate long term storage conditions at room temperature. At 2, 4, 6, and 8 week intervals, a portion of the emulsion was removed from the storage container, formed into a sheet, dried, and then tested for physical properties. The results are shown in Table VII. The results show that the emulsion produced using 2-amino-2-methyl-1-propanol had a higher initial elongation and that this higher elongation persisted throughout the aging period.

TABLE VII

| Amine | diethylamine | 2-amino-2-methyl-1-propanol |
|---|---|---|
| Initial Physical Properties | | |
| Tensile Strength, MPa | 1.2 | 1.0 |
| Elongation, percent | 574 | 872 |
| Tear Strength, kN/m | 9.1 | 8.2 |
| After 2 weeks aging of the emulsion at 50° C. | | |
| Tensile Strength, MPa | 0.96 | 0.84 |
| Elongation, percent | 447 | 721 |
| Tear Strength, kN/m | 7.2 | 7.0 |
| After 4 weeks aging of the emulsion at 50° C. | | |
| Tensile Strength, MPa | 0.75 | 0.78 |
| Elongation, percent | 243 | 630 |
| Tear Strength, kN/m | 5.4 | 6.0 |
| After 6 weeks aging of the emulsion at 50° C. | | |
| Tensile Strength, MPa | 0.65 | 0.64 |
| Elongation, percent | 143 | 457 |
| Tear Strength, kN/m | 4.0 | 5.1 |
| After 8 weeks aging of the emulsion at 50° C. | | |
| Tensile Strength, MPa | 0.61 | 0.68 |
| Elongation, percent | 47 | 406 |
| Tear Strength, kN/m | 1.2 | 5.4 |

That which is claimed is:

1. A method of improving the shelf life of a silicone elastomeric emulsion which comprises an anionically stabilized, hydroxyl endblocked polydiorganosiloxane, colloidal silica, an alkyl tin salt, and filler other than colloidal silica comprising preparing the silicone elastomeric emulsion by
(I) mixing
(A) 100 parts by weight of an anionically stabilized, hydroxyl endblocked polydiorganosiloxane having a weight average molecular weight of greater than 50,000, present as an oil-in-water emulsion,
(B) from 1 to 100 parts by weight of colloidal silica, and (C) from 0.1 to 1.5 parts by weight of alkyl tin salt, adjusting to a pH of greater than 9, withholding the filler other than colloidal silica, to give a base emulsion, (II) aging the base emulsion for at least 2 weeks at room temperature, then (III) mixing the aged base emulsion with from 10 to 200 parts by weight of filler other than colloidal silica based upon 100 parts by weight of (A) in the aged base emulsion, to produce a silicone elastomeric emulsion having a pH of greater than 9 and a solids content of greater than 40 percent by weight.

2. The method of claim 1 in which (A) has a solids content of greater than 40 percent, the polydiorganosiloxane of (A) is polydimethylsiloxane and has a weight average molecular weight in the range of 200,000 to 700,000, (B) is in the form of a sodium stabilized colloidal silica dispersion, and (C) is from 0.1 to 0.75 part by weight of dialkyltindicarboxylate.

3. The method of claim 1 in which the mixture of step (I) is adjusted to a pH of from 9 to 12 with an organic amine composed of carbon, hydrogen, and nitrogen atoms or carbon, hydrogen, nitrogen, and oxygen atoms, said amine being soluble in the amount of water present in the emulsion.

4. The method of claim 3 in which the amine is selected from the group consisting of diethylamine, monoethanolamine, morpholine, and 2-aminio-2-methyl-1-propanol.

5. The method of claim 4 in which the amine is 2-amino-2-methyl-1-propanol.

6. The method of claim 5 in which the filler other than colloidal silica is calcium carbonate.

7. The method of claim 4 in which an antifoam agent is added during mixing step (I).

8. The method of claim 7 in which a freeze-thaw stabilizer is added during mixing step (I).

9. The method of claim 8 in which a thickener is added during mixing step (I).

10. The method of claim 9 in which the ingredients of step (I) are mixed by mixing the silica (B) and the organic amine, then adding the polydiorganosiloxane emulsion (A), the antifoam agent, freeze-thaw stabilizer, thickener, and alkyl tin salt (C).

11. The method of claim 10 in which the thickener is added as the last ingredient in the mixing process of step (I).

12. The method of claim 2 in which the filler is selected from the group comprising kaolin, ground quartz, aluminum oxide, titanium dioxide, and calcium carbonate.

13. The method of claim 2 in which (B) is from 1 to 20 parts by weight; the mixture of step (I) is adjusted to a pH of from 9 to 12 with an organic amine composed of carbon, hydrogen, and nitrogen atoms, or carbon, hydrogen, nitrogen, and oxygen atoms, said amine being soluble in the amount of water present in the emulsion; and the filler is kaolin clay.

14. The method of claim 2 in which (B) is from 2 to 20 parts by weight; the mixture of step (I) is adjusted to a pH of from 9 to 12 with an organic amine composed of carbon, hydrogen, and nitrogen atoms, or carbon, hydrogen, nitrogen, and oxygen atoms, said amine being soluble in the amount of water present in the emulsion; and the filler is calcium carbonate having an average particle size of less than 5 micrometers.

15. The method of claim 14 in which the organic amine is 2-amino-2-methyl-1-propanol.

16. The method of claim 14 in which the silicone elastomeric emulsion has a flow of less than 8 mm when tested in accordance with ASTM D-2202.

17. The method of claim 14 in which (A) has a solids content of greater than 55 percent; (B) is from 2 to 5 parts by weight in which the solids content is from 40 to 60 percent by weight; (C) is 0.2 to 0.3 part by weight; the mixture of step (I) is adjusted to a pH of from 9 to 12 with an amine selected from the group consisting of diethylamine, monoethanolamine, morpholine, and 2-amino-2-methyl-1-propanol; and the filler is from 110 to 180 parts by weight of calcium carbonate having a maximum particle size of about 5 micrometers and an average particle size of between 0.5 and 1.0 micrometer; the silicone elastomeric emulsion having sufficient viscosity to be non-slump.

18. The method of claim 10 in which mixing step (III) uses a high shear mixer.

19. A method of improving the shelf life of a silicone elastomeric emulsion comprising an anionically stabilized, hydroxyl endblocked polydiorganosiloxane, colloidal silica, an alkyl tin salt, and filler other than colloidal silica wherein the improvement comprises (I) preparing a base emulsion by mixing
(A) 100 parts by weight of an anionically stabilized, hydroxyl endblocked polydiorganosiloxane having a weight average molecular weight of greater than 50,000, present as an oil-in-water emulsion,
(B) from 1 to 100 parts by weight of colloidal silica, and
(C) from 0.1 to 1.5 parts by weight of alkyl tin salt; adjusting to a pH of greater than 9, (II) aging the base emulsion for at least 2 weeks at room temperature, then (III) mixing the aged base emulsion with from 10 to 200 parts by weight of filler other than colloidal silica based upon 100 parts of (A) in the aged base emulsion, the product having a pH of greater than 9 and a solids content of greater than 40 percent by weight to yield a silicone elastomeric emulsion.

20. The method of claim 19 in which (A) has a solids content of greater than 40 percent, the polydiorganosiloxane of (A) is polydimethylsiloxane and has a weight average molecular weight in the range of 200,000 to 700,000, (B) is in the form of a sodium stabilized colloidal silica dispersion, and (C) is from 0.1 to 0.75 part by weight of dialkyltindicarboxylate.

21. The method of claim 20 in which (B) is from 2 to 20 parts by weight; the mixture of step (I) is adjusted to a pH of from 9 to 12 with an organic amine composed of carbon, hydrogen, and nitrogen atoms, or carbon, hydrogen, nitrogen, and oxygen atoms, said amine being soluble in the amount of water present in the emulsion; and the filler is calcium carbonate having an average particle size of less than 5 micrometers.

22. The method of 21 in which (A) has a solids content of greater than 55 percent; (B) is from 2 to 5 parts by weight in which the solids content is from 40 to 60 percent by weight; (C) is 0.2 to 0.3 part by weight; the mixture of step (I) is adjusted to a pH of from 9 to 12 with an amine selected from the group consisting of diethylamine, monoethanolamine, morpholine, and 2-amino-2-methyl-1-propanol; and the filler is from 110 to 180 parts by weight of calcium carbonate having a maximum particle size of about 5 micrometers and an average particle size of between 0.5 and 1.0 micrometer; the silicone elastomeric emulsion having sufficient viscosity to be non-slump.

23. The improved silicone elastomeric emulsion produced by the method of claim 1, 2, 5, 6, 9, 13, 14, 15, 17, 19, or 22.

24. The improved silicone elastomer obtained by drying the silicone elastomeric emulsion produced by the method of claim 23.

* * * * *